United States Patent [19]

Karl et al.

[11] 4,401,598
[45] Aug. 30, 1983

[54] PRODUCTION OF ORGANOSILICON COMPOUNDS HAVING AZIDO GROUPS

[75] Inventors: Alfons Karl, Hanau; Wolfgang Buder, Rodenbach, both of Fed. Rep. of Germany

[73] Assignee: Degussa Aktiengesellschaft, Frankfurt, Fed. Rep. of Germany

[21] Appl. No.: 312,979

[22] Filed: Oct. 20, 1981

[30] Foreign Application Priority Data

Oct. 25, 1980 [DE] Fed. Rep. of Germany ....... 3040328

[51] Int. Cl.³ ............................................ C07C 117/00
[52] U.S. Cl. .................................................. 260/349
[58] Field of Search ........................................ 260/349

[56] References Cited

U.S. PATENT DOCUMENTS 3,697,551 10/1972 Thomson ............................. 260/349
3,705,911 12/1972 Thomson ............................. 260/349
4,292,234 9/1981 Borel ................................... 260/349

FOREIGN PATENT DOCUMENTS 18503 11/1980 European Pat. Off. .
1377214 12/1974 United Kingdom .
1516193 6/1978 United Kingdom .

OTHER PUBLICATIONS

Dehmlow, *Angewandte Chem. Int. Ed. Eng.*, vol. 16, pp. 493–505 (1977).
Dehmlow, *Angewandte Chemie*, vol. 89, pp. 521–533 (1977).
Gokel et al., *Synthesis*, (1976) pp. 168–184.

*Primary Examiner*—John M. Ford
*Attorney, Agent, or Firm*—Cushman, Darby & Cushman

[57] ABSTRACT

There are prepared azido groups containing organosilicon compounds of the formula

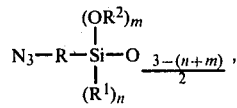

where R is a divalent hydrocarbon group having 1 to 8 carbon atoms which is free from ethylenically unsaturated bonds and whose carbon chain in a given case, is interrupted once by —O—, —S—, or —NR³ where R³ is hydrogen, methyl, ethyl, or phenyl, R¹ is a univalent alkyl group having 1 to 3 carbon atoms, phenyl, benzyl, or tolyl, R² is an alkyl group having 1 to 4 carbon atoms, phenyl, benzyl, or an alkoxyalkyl group having a total of up to four carbon atoms, m is zero, 1, 2, or 3, and n is zero, 1 or 2 whereby m<3−n, by reacting a halosilane of the formula $$X-R-SiR_n^1(OR^2)_{3-n},$$  II in which X is chlorine or bromine and the other symbols are as defined above with an azide of the formula $$MN_3$$  III in which M is lithium, sodium, potassium, or ammonium, whereby in a give case, there is used a phase transfer catalyst whereupon there is carried out a hydrolysis or partial hydrolysis. Alternatively the hydrolysis or partial hydrolysis can take place first wherein there is first carried out the hydrolysis of one or more alkoxysilyl groups —OR² and subsequently there is carried out the reaction with the azide. The organosilicon compounds are valuable intermediates and also can be used as coupling agents for preparing silica reinforced rubber.

37 Claims, No Drawings

PRODUCTION OF ORGANOSILICON COMPOUNDS HAVING AZIDO GROUPS

BACKGROUND OF THE INVENTION

Silanes with functional azido groups which are connected to the silicon atom via an intermediate member having a carbon chain are already known, for example, the groups of silylazidoformates

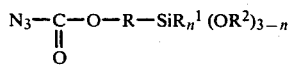

(Thomson U.S. Pat. No. 3,705,911, Thomson U.S. Pat. No. 3,697,551, British Pat. No. 1,377,214) and the silylsulfonic acid azides

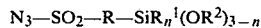

(Thomson U.S. Pat. No. 3,705,911, Thomson U.S. Pat. No. 3,697,551, British Pat. No. 1,516,193). The entire disclosures of these two U.S. patents and two British patents is hereby incorporated by reference and relied upon.

There have also been proposed silylcarbamic acid azides of the formula

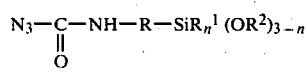

These azidosilanes because of their bifunctional character, they already have alkoxy groups on the silicon atom and an azido group on an intermediate member are suited as so-called coupling agents between organic polymers and inorganic substrates. However, their relatively high cost of production and in part also their slight thermal stability and their sensitivity to hydrolysis, militate against a wide use of these azidosilanes.

There have recently been disclosed in Borel published EPO application No. A-0,018,503 compounds suitable for use as coupling agents represented by the formula

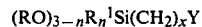

where R and $R^1$ are linear or branched alkyl or cycloalkyl groups having one to ten carbon atoms, aromatic or substituted aromatic groups having six to ten carbon atoms, x is an integer from 1 to 20 and Y is a azide. In the only working example of preparing such compounds 3-(trimethoxysilyl)propyl azide is prepared by reacting 0.5 mole of 3-trimethoxysilylpropylchloride with 1.72 moles of sodium azide in 1 liter of methanol. After reacting for 11 days at reflux a 62% yield of the azide is obtained. The entire disclosure of Borel is hereby incorporated by reference and relied upon.

SUMMARY OF THE INVENTION

According to the invention there are prepared organosilicon compounds, particularly azidoalkyl and azidoalkaryloxysilanes and their hydrolysis products in very good yields by a very simple, smooth running and economical method of production. These compounds have the formula

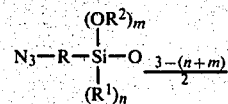

where R is a divalent hydrocarbon group having 1 to 8 carbon atoms which is free from ethylenically unsaturated bonds and whose carbon chain in a given case, is interrupted once by —O—, —S—, or —$NR^3$ where $R^3$ is hydrogen, methyl, ethyl, or phenyl, $R^1$ is a univalent alkyl group having 1 to 3 carbon atoms, phenyl, benzyl, or tolyl, $R^2$ is an alkyl group having 1 to 4 carbon atoms, phenyl, benzyl, or an alkoxyalkyl group having a total of up to four carbon atoms, m is zero, 1, 2, or 3, and n is zero, 1 or 2 whereby m<3−n m and n accordingly are positive integral numbers; m or n also can be zero. The products are prepared by reacting a halosilane of the formula

in which X is chlorine or bromine and the other symbols are as defined above with an azide of the formula

in which M is lithium, sodium, potassium, or ammonium whereby in a given case, there is used a phase transfer catalyst whereupon there is carried out a hydrolysis or partial hydrolysis. Alternatively the hydrolysis or partial hydrolysis can take place first wherein there is first carried out the hydrolysis of one or more alkoxysilyl groups —$OR^2$ and subsequently there is carried out the reaction with the azide. Of the abovementioned halosilanes there are preferred those where n is zero and R is a divalent aliphatic hydrocarbon group having 1 to 4 carbon atoms.

Typical examples of silanes within the invention are azidomethyltrimethoxysilane, azidomethyltriethoxysilane, 2-azidoethyltrimethoxysilane, 2-azidoethyltriethoxysilane, 3-azidopropyltrimethoxysilane, 3-azidopropyltriethoxysilane, 3-azidopropyltris(methoxyethoxy)silane, 3-azidopropylmethyldiethoxysilane, p-azidomethylphenyltrimethoxysilane, 4-azidobutyltri-n-butoxysilane, 5-azidopentyldimethoxyphenylsilane, 6-azidohexyldiethoxybenzylsilane, 7-azidoheptylmethoxydimethylsilane, 8-azidooctylethoxydiethylsilane, 3-azidopropyldiethoxytolylsilane, 2-azido-i-propyldiethoxyphenylsilane, 2-azido-i-propyldimethoxybenzyloxysilane, 3-azidopropyldiethoxybenzyloxysilane, 3-azidopropyldiethoxyphenyloxysilane, 3-azidopropyltris(methoxyethoxy)silane, 3-azidopropyltris(ethoxyethoxy)silane, and 3-azidopropyltris(methoxypropoxy)silane. Additional compounds include 3-azidopropyldimethoxyethylsilane, 2-azidoethyldiethoxypropylsilane, 3-azidopropyltripropoxysilane, 3-azidopropyltributoxysilane.

If R is a divalent hydrocarbon group with an interrupted carbon chain, R can have the following structure:

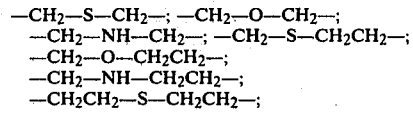

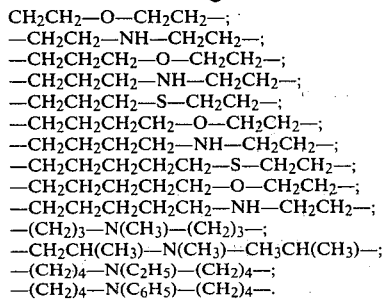

Illustrative compounds include azidomethylthiomethyltriethoxysilane, azidomethoxymethyltriethoxysilane, azidomethylaminomethyltrimethoxysilane, azidoethoxyethyltriethoxysilane, azidopropyl-N-methylaminopropyltriethoxysilane, azidobutyl-N-phenylaminobutyltrimethoxysilane.

In the reaction of the haloorganylalkoxysilane of formula II with an alkali azide or ammonium azide, the process is carried out in a given case, in the presence of a preferably solid-liquid-phase transfer catalyst in an amount of 0.1 to 12 mole percent, preferably based on the azide of the above formula III. The reaction proceeds according to the following equation:

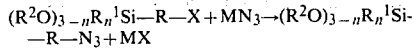

The individual symbols have the meanings set forth above in formula I, II, and III. To carry out the reaction the use of a catalyst is not always necessary. Thus for the reaction with lithium azide no catalyst is necessary. In contrast in the reaction of bromoalkoxysilanes with sodium azide the reaction is accelerated by a catalyst. For the reaction of the corresponding chlorosubstituted compounds with sodium azide, the use of a catalyst is necessary. (Thus note the very long reaction time required by Borel in Example 1.) As catalyst there can be employed the known phase transfer catalysts (see e.g. B. E. V. Dehmlow: "Fortschritte der Phasentransfer-Katalyse" in Angewandte Chemie 89, pages 521–533 (1977), the entire disclosure of which is hereby incorporated by reference and relied upon). Of these there are especially suitable the onium salts such as the quaternary ammonium salts having organic groups, for example, alkyl groups, or an alkaryl group on the nitrogen atoms. Thus there can be used oinum salts having different groups attached thereto, e.g. methyl, ethyl, propyl, butyl, octyl, decyl, hexadecyl, octadecyl, or benzyl, or mixtures thereof attached to the nitrogen atom. The onium salts can be, for example, the chlorides, bromides, or iodides.

Furthermore there can be used phosphonium salts, arsonium salts, or their mixtures with each other or with the quaternary ammonium salts. The same grouping can be attached to the phosphorus or arsenic atom as mentioned in connection with the quaternary ammonium compounds. Furthermore crown ethers are suited as catalysts. Reference is made to the concerned literature in regard to these phase transfer catalysts, e.g. to the book of E. V. Dehmlow and S. S. Dehmlow "Phase Transfer Catalysis". The entire disclosure of this book is hereby incorporated by reference and relied upon. The crown ethers (see Synthesis 1976, pages 168 to 184, the entire disclosure of which is hereby incorporated by reference and relied upon) generally are needed in larger amounts than is necessary with, for example, quaternary ammonium compounds. Amounts up to about 10 mole percent of crown ether are not uncommon.

The reaction can be carried out directly with the reactants insofar as at least one of these is liquid at the reaction temperature, or preferably at room temperature. Thereby generally there are needed temperatures between about 80° C., preferably 100° C. and about 180° C., preferably 150° C.

However, it can be advantageous to carry out the reaction in the presence of a preferably organic liquid which is capable of at least partially dissolving the reactants. Such liquids which generally are designated as solvents or diluents are for example alcohols, especially monohydric alcohols such as lower aliphatic alcohols, e.g. methanol, ethanol, isopropanol, n-propanol, the butanols, e.g. n-butanol, butanol-2, and isobutanol and higher alcohols, furthermore, ketones such as acetone, diethyl ketone, methyl ethyl ketone, and higher ketones as well as cyclic ketones, e.g. cyclopentanone and cyclohexanone as well as cyclic ethers, as for example, dioxane and tetrahydrofurane, furthermore chlorohydrocarbons as for example, 1,2-dichloroethane, tetrachloroethane, trichloroethylene, chloroform, tetrachloroethylene, dichlorobenzene, tetrachlorobenzene and hexachlorobenzene, furthermore, aliphatic nitro compounds (nitroalkanes) such as nitromethane, nitroethane, nitropropane, and higher nitro compounds of this type, furthermore, dimethyl formamide, diethyl formamide, and the liquid alkyl cyanides such as acetonitrile, propionitrile and the higher alkyl cyanides. The reaction temperature in the presence of the organic liquid (solvent) is between about room temperature or preferably slightly higher temperature of about 25° C. and the boiling point of the solvent or of the reaction mixture.

It is generally not necessary to carry out the reaction under pressure, but it can be suitable to use elevated pressure for example, in the reaction of chloroorganylalkoxysilanes with sodium azide in ethanol, whereby preferably the process is carried out under the autogenous pressure of the solvent at about 110° to 130° C.

The molar ratio of the starting material of the above formula II to that of formula III is from 1:1 to 1:1.5, preferably from 1:1 to 1:1.2. Especially the reaction is carried out at a 10 percent excess of the azide as for example, of sodium azide. The yields of azidosilanes are of considerable height, as shown in the examples, that is they amount to up to 95% (based on the weight of the reactants not used in excess), depending on the reactivity of the reactants employed, The reaction times are considerably shorter than those required by Borel.

The azidosilanes (some of which are new) are colorless, distillable liquids of musty odor. They are sensitive to neither percussion nor shock. Furthermore, they have the advantage that their azido groups are stable to hydrolysis. Therefore, there can be produced from them hydrolytically hydrolysis products in the form of siloxanes without splitting off the azido group as for example, by partial hydrolysis of the alkoxysilyl group or groups. Thereby there are formed permanent Si—O—Si bridges and the two azido groups on the molecule can be used for subsequent reactions. For example, the latter can be converted with the thermal or photochemical splitting off or nitrogen via the nitrene intermediate step covalent bonds, e.g. to organic polymers.

The described hydrolysis need not be complete so that a partial hydrolysis also can occur. This partial hydrolysis occurs especially if the silane contains several alkoxysilyl groups in the molecule.

Furthermore the organosilicon compounds are intermediate products with alkoxy groups capable of condensation reactions. The hydrolysis as well as the condensation reactions are carried out by procedures known of themselves. They lead to higher molecular weight compounds with, for example, less volatility or higher boiling points.

The azido group containing organosilicon compounds of the invention have the further advantage that they are very stable thermally. Thus for example, the azidopropyltriethoxysilane is first destroyed at above 185° C. slowly with evolution of nitrogen. In comparison the known acid azides of the general formula R—CO—$N_3$ decompose already by heating in benzene solution while operating under reflux. The azidosilanes, and siloxanes are readily available organosilicon compounds when made by the above presented process of production of the invention.

Unless otherwise indicated all parts and percentages are by weight.

The process can comprise, consist essentially of, or consist of the stated steps with the materials set forth.

The following examples further explain the invention but do not limit it. In these examples, the elemental analyses and yields are given in percent by weight. The calculated values of the elemental analyses are added in parentheses.

EXAMPLE 1

Production of 3-Azidopropyltriethoxysilane By The Described Methods (a) 1.0 mole of 3-chloropropyltriethoxysilane (Cl-PTES) and 1.1 moles of sodium azide were heated together in a 500 ml capacity three neck flask made of glass and equipped with reflux condenser and magnetic stirrer and in the presence of 5 mole percent of a catalyst on the basis of a mixture of tris(n-$C_8$ to $C_{10}$ alkyl)-methyl ammonium chloride with stirring for 3 hours at 140° C. The rectification subsequently carried out thereon at reduced pressure gave the 3-azidopropyltriethoxysilane ($N_3$-PTES) in a yield of 95 weight percent. The $N_3$-PTES had the following properties:

B.P.: 76°–78° C. at a reduced pressure of 0.9 mbar.

$v(N_3) = 2095$ cm$^{-1}$ ($v(N_3)$ means the stretching of the azido group in the IR-Spectrum). The elemental analysis gave the following values in weight percent:

C: 43.93 (43.70). H: 8.75 (8.56). N: 16.68 (16.99).

The calculated values are added in the paranteheses.

(b) 1.0 mole of Cl-PTES and 1.1 moles of sodium azide in 500 ml of acetonitrile were heated in the presence of 3 mole percent of the same catalyst as under (a). The salt which precipitated was separated off. The subsequent distillation under reduced pressure gave $N_3$-PTES but in a yield of 92 weight percent.

(c) to (h) The following production methods were carried out analogous to (b) whereby, however, with the modification in turn there was employed ethanol, dioxane, acetone, 1,2-dichloroethane, nitroethane and dimethyl formamide as solvent. The reaction in ethanol was carried out in an autoclave at 130° C., furthermore, in turn in dioxane, acetone, in 1,2-dichloroethane and in nitromethane at the boiling point of the reaction mixture and furthermore in dimethyl formamide at 140° C. The yields of $N_3$-PTES in each case were between about 80 and 95 weight percent.

(i) 1.0 mole of Cl-PTES and 1.2 moles of lithium azide in 500 ml of ethanol were heated for twelve hours under stirring and reflux. After separation of the salt the distillation under reduced pressure which followed then yielded the compound $N_3$-PTES in a yield of 73 weight percent.

(j) 1.0 mole of 3-bromopropyltriethoxysilane and 1.1 moles of sodium azide were heated in the presence of 3 mole percent of the catalyst described in (a) for 8 hours in 500 ml of ethanol under stirring and reflux. After separation of the precipitated salt, the subsequent distillation under reduced pressure gave the $N_3$-PTES in a yield of 89 weight percent.

EXAMPLE 2

Production of 3-Azidopropyltrimethoxysilane (a) 1.0 mole of 3-azidopropyltrimethoxysilane (Br-PTMS) and 1.1 mole of sodium azide were heated in the presence of 3 mole percent of the catalyst described in Example 1 (a) in 500 ml of methanol during 12 hours under stirring and reflux. After separation of the salt the subsequent distillation under reduced pressure gave the 3-azidopropyltrimethoxysilane in a yield of 91 weight percent. The following characteristics were determined for the compound:

B.P.: 49°–50° C. (at 1.1 mbar).

$v(N_3) = 2095$ cm$^{-1}$.

The elemental analysis gave the following results:

C: 35.22 (35.10). H: 7.40 (7.36). N: 20.41 (20.47).

Calculated values are again given in parantheses.

(b) 1.0 mole of 3-chloropropyltrimethoxysilane and 1.1 moles of sodium azide were heated in the presence of 3 mole percent of the catalyst described in Example 1 (a) in 500 ml of acetonitrile for eight hours with stirring and under reflux. After separation of the salt the subsequent distillation under reduced pressure gave the 3-azidopropyltrimethoxysilane now in a yield of 95 weight percent.

EXAMPLE 3

Production of 3-Azidopropylmethyldiethoxysilane 1.0 mole of 3-chloropropylmethyldiethoxysilane and 1.1 moles of sodium azide were heated in the presence of 5 mole percent of the catalyst described in Example 1 (a) for three hours under stirring at 140° C. After the distillation under reduced pressure there was obtained the 3-azidopropylmethyldiethoxysilane in a yield of 94 weight percent.

The following characteristics were ascertained for this compound:

B.P.: 56°–58° C. (1.33 mbar).

$v(N_3) = 2090$ cm$^{-1}$.

Elemental analysis:

C: 44.19 (43.80). H: 9.55 (9.65). N: 18.91 (19.16).

EXAMPLE 4

Production of 3-Azidopropyltris(methoxyethoxy)-silane 1.0 mole of 3-chloropropyltris(methoxyethoxy)-silane and 1.1 moles of sodium azide in 500 ml of acetonitrile were heated in the presence of 5 mole percent of the catalyst described in Example 1 (a) for eight hours under reflux and stirring. After separation of the salt the subsequent distillation under reduced pressure gave the 3-azidopropyltris(methoxyethoxy)silane in a yield of 84 weight percent with the following characteristics:

B.P.: 120° C. (0.01 mbar).
$\nu(N_3) = 2095$ cm$^{-1}$.
Results of the elemental analysis:
C: 42.82 (42.71). H: 8.20 (8.06). N: 12.10 (12.45).

EXAMPLE 5

Production of 2-Azidoethyltrimethoxysilane 1.0 mole of 2-chloroethyltrimethoxysilane and 1.1 moles of sodium azide in 500 ml of acetonitrile were heated in the presence of 3 mole percent of the catalyst described in Example 1 (a) for ten hours under stirring and reflux. After separation of the salt the subsequent distillation under reduced pressure gave the 2-azidoethyltrimethoxysilane in a yield of 61 weight percent with the following characteristics:
B.P.: 54°-56° C. (1.33 mbar).
$\nu(N_3) = 2090$ cm$^{-1}$.
The elemental analysis produced the following results:
C: 31.42 (31.40). H: 7.06 (6.85). N: 21.60 (21.97).

EXAMPLE 6

Production of 2-Azidoethyltriethoxysilane 1.0 mole of 2-chloroethyltriethoxysilane and 1.1 moles of sodium azide in 500 ml of acetone were heated in the presence of 3 mole percent of the catalyst described in Example 1 (a) for ten hours under intensive stirring and under reflux. After separation of the salt the subsequent distillation under reduced pressure gave the 2-azidoethyltriethoxysilane in a yield of 69 weight percent with the following characteristics:
B.P.: 68°-70° C. (2.0 mbar).
$\nu(N_3) = 2090$ cm$^{-1}$.
Results of the elemental analysis:
C: 41.57 (41.18). H: 8.31 (8.21). N: 17.66 (18.01).

EXAMPLE 7

Production of Azidomethyltriethoxysilane 0.5 mole of chloromethyltriethoxysilane and 0.6 mole of lithium azide in 250 ml of ethanol were heated for twelve hours under stirring and reflux. After separation of the salt and after the subsequent distillation under reduced pressure there were obtained the azidomethyltriethoxysilane in a yield of 70 weight percent. The characteristics of this compound are:
B.P.: 90°-94° C. (21.3 mbar).
$\nu(N_3) = 2095$ cm$^{-1}$.
The elemental analysis gave the following values:
C: 38.52 (38.34). H: 8.03 (7.81). N: 19.26 (19.16).

EXAMPLE 8

Production of p-Azidomethylphenyl-trimethoxysilane 1.0 mole of p-chloromethylphenyltrimethoxysilane and 1.1 moles of sodium azide were heated in the presence of 5 mole percent of the catalyst described in Example 1 (a) for three hours under stirring at 150° C. Then the salt formed was separated and the subsequent distillation under reduced pressure gave the p-azidomethylphenyltrimethoxysilane in a yield of 89 weight percent with the following characteristics:
B.P.: 94°-96° C. (0.3 mbar).
$\nu(N_3) = 2095$ cm$^{-1}$.
The elemental analysis gave the following values:
C: 46.90 (47.41). H: 6.11 (5.97). N: 16.38 (16.59).

EXAMPLE 9

1.0 mole of Cl-PTES and 1.1 moles of sodium azide were heated in the presence of 5 mole percent of 18-crown-6 (1,4,7,10,13,16-hexaoxacyclooctadecane) as catalyst in 500 ml of acetonitrile for eight hours under intensive stirring and under reflux. The precipitated sodium chloride was separated off. The subsequent distillation under reduced pressure of 0.9 mbar gave the $N_3$-PTES in this case in a yield of 83 weight percent.

EXAMPLE 10

Using 3 mole percent of benzyltriethylammonium chloride as catalyst there were heated 1.0 mole of Cl-PTES and 1.1 moles of sodium azide in 500 ml of acetonitrile for eight hours under intensive stirring and under reflux. The precipitated salt was separated off. The subsequent distillation under reduced pressure gave the $N_3$-PTES in this case in a yield of 93 weight percent.

EXAMPLE 11

1.0 mole of Cl-PTES and 1.1 moles of sodium azide in 500 ml of acetonitrile were heated in the presence of 3 mole percent of tributylhexadecylphosphonium bromide as catalyst for eight hours under intensive stirring and under reflux. Thereby sodium chloride precipitated. This was separated off and the subsequent distillation under reduced pressure gave the $N_3$-PTES in this case a yield of 90 weight percent.

According to known processes the corresponding hydrolysis products, thus siloxanes, can be produced from the compounds of the invention containing alkoxysilyl groups. In the following example there is described a process for producing such hydrolysis products.

EXAMPLE 12

To 2 moles of $N_3$-PTES at room temperature in a customary one liter capacity glass flask equipped with stirrer, dropping funnel, and thermometer there were slowly dropped in a mixture of 1 mole of water and 50 ml of ethanol under stirring. After two hours of stirring, likewise at room temperature, the reaction was concluded and the ethanol drawn off under reduced pressure of 0.133 bar. The clear liquid remaining behind, the "dimer" of the $N_3$-PTES, was present already as an analytically pure compound.

The reaction was practically complete according to the following equation:

$$N_3(CH_2)_3Si(OC_2H_5)_3 + HOH + (C_2H_5O)_3Si(CH_2)_3N_3 \longrightarrow$$

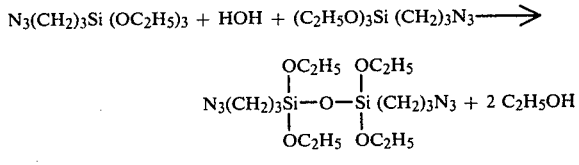

The following characteristics were ascertained from this siloxane:
$\nu(N_3) = 2090$ cm$^{-1}$.
Molecular weight: 420.62.
Summation formula: $C_{14}H_{32}N_6O_5Si$.
The following values were determined gravimetrically in point:
C: 40.18 (39.98). H: 8.06 (7.67). N: 19.54 (19.98).
The calculated values are given in parantheses.

The hydrolysis or partial hydrolysis can also be carried out at once in connection with the substitution reaction, in a given case, in the same reaction vessel.

The silanes and siloxanes can be employed as intermediate products for further synthesis, thus for example, the azido group can be reduced or be added on an unsaturated compound. Also the silanes and siloxanes can be used in the same manner as those of the above-mentioned Borel EPO application, e.g. as coupling agents for preparing silica bonded rubber, e.g. natural rubber, butadiene-styrene copolymer, or polyisoprene.

What is claimed is:

1. A process of preparing an azido group containing organosilicon compound of the formula

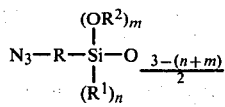

where R is a divalent hydrocarbon group having 1 to 8 carbon atoms which is free from ethylenically unsaturated bonds or R is $(CH_2)_o X(CH_2)_p$ where o is 1 to 7, p is 1 to 7, and the total of o and p is 2 to 8 and X is O, S, or

where $R^3$ is hydrogen, methyl, ethyl, or phenyl, $R^1$ is a univalent alkyl group having 1 to 3 carbon atoms, phenyl, benzyl, or tolyl, $R^2$ is an alkyl group having 1 to 4 carbon atoms, phenyl, benzyl, or an alkoxyalkyl group having a total of up to four carbon atoms, m is zero, 1, 2, or 3, and n is zero, 1 or 2 whereby m<3−n, comprising reacting a halosilane of the formula

in which X is chlorine or bromine with an azide of the formula $MN_3$ (III)

in which M is lithium.

2. A process according to claim 1 where $(CH_2)_o X(CH_2)_p$ is —CH2—S—CH2—; —CH2—O—CH2—; —CH2—NH—CH2—; —CH2—S—CH2CH2—; —CH2—O—CH2CH2—; —CH2—NH—CH2CH2—; —CH2CH2—S—CH2CH2—; CH2CH2—O—CH2CH2—; —CH2CH2—NH—CH2CH2—; —CH2CH2CH2—O—CH2CH2—; —CH2CH2CH2—NH—CH2CH2—; —CH2CH2CH2—S—CH2CH2—; —CH2CH2CH2CH2—O—CH2CH2—; —CH2CH2CH2CH2—NH—CH2CH2—; —CH2CH2CH2CH2CH2—S—CH2CH2—; —CH2CH2CH2CH2CH2—O—CH2CH2—; —CH2CH2CH2CH2CH2—NH—CH2CH2—; —(CH2)3—N(CH3)—(CH2)3—; —CH2CH(CH3)—N(CH3)—CH3CH(CH3)—; —(CH2)4—N(C2H5)—(CH2)4—; or —(CH2)4—N(C6H5)—(CH2)4—.

3. A process according to claim 18 where $(CH_2)_o X(CH_2)_p$ is —CH2—S—CH2—; —CH2—O—CH2—; —CH2—NH—CH2—; —CH2—S—CH2CH2—; —CH2—O—CH2CH2—; —CH2—NH—CH2CH2—; —CH2CH2—S—CH2CH2—; CH2CH2—O—CH2CH2—; —CH2CH2—NH—CH2CH2—; —CH2CH2CH2—O—CH2CH2—; —CH2CH2CH2—NH—CH2CH2—; —CH2CH2CH2—S—CH2CH2—; —CH2CH2CH2CH2—O—CH2CH2—; —CH2CH2CH2CH2—NH—CH2CH2—; —CH2CH2CH2CH2CH2—S—CH2CH2—; —CH2CH2CH2CH2CH2—O—CH2CH2—; —CH2CH2CH2CH2CH2—NH—CH2CH2—; —(CH2)3—N(CH3)—(CH2)3—; —CH2CH(CH3)—N(CH3)—CH3CH(CH3)—; —(CH2)4—N(C2H5)—(CH2)4—; or —(CH2)4—N(C6H5)—(CH2)4—.

4. A process according to claim 1 carried out in the absence of a catalyst.

5. A process according to claim 1 wherein the mole ratio of halosilane to azide is from 1:1 to 1:1.5.

6. A process according to claim 5 wherein the reaction is carried out in the presence of an organic compound which is liquid at room temperature and in which at least one of the reactants is at least partially soluble.

7. A process according to claim 5 comprising separating the halide salt from the reaction product and then at least partially hydrolyzing the azido containing organosilicon compound.

8. A process according to claim 7 including the step of rectifying the azido containing organosilicon compound after separating the halide salt and prior to hydrolysis.

9. A process according to claim 7 wherein the hydrolysis is only partial.

10. A process according to claim 5 comprising at least partially hydrolyzing the halosilane prior to reacting the halosilane with the azide.

11. A process according to claim 10 wherein the hydrolysis is only partial.

12. A process according to claim 5 wherein there is employed a 10% excess of the azide.

13. A process according to claim 6 wherein the reaction is carried out at a temperature between room temperature and the boiling temperature of the reaction mixture.

14. A process according to claim 5 wherein the reaction is carried out at a temperature between about 80° C. and 180° C.

15. A process according to claim 5 where R is a divalent hydrocarbon group having 1 to 8 carbon atoms.

16. A process according to claim 15 where n is zero.

17. A process according to claim 16 where R is an alkylene group of 1 to 4 carbon atoms.

18. A process of preparing an azido group containing organosilicon compounds of the formula

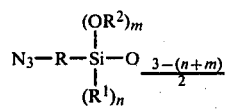

where R is a divalent hydrocarbon group having 1 to 8 carbon atoms which is free from ethylenically unsaturated bonds or R is $(CH_2)_o X(CH_2)_p$ where o is 1 to 7, p is 1 to 7, and the total of o and p is 2 to 8 and X is O, S, or

where $R^3$ is hydrogen, methyl, ethyl, or phenyl, $R^1$ is a univalent alkyl group having 1 to 3 carbon atoms, phenyl, benzyl, or tolyl, $R^2$ is an alkyl group having 1 to 4 carbon atoms, phenyl, benzyl, or an alkoxyalkyl group having a total of up to four carbon atoms, m is zero, 1, 2, or 3, and n is zero, 1 or 2 whereby m <3−n, comprising reacting a halosilane of the formula $$X-R-SiR_n^1(OR^2)_{3-n} \qquad (II)$$

in which X is chlorine or bromine with an azide of the formula $$MN_3 \qquad (III)$$

in which M is lithium, sodium, potassium, or ammonium in the presence of a phase transfer catalyst.

19. A process according to claim 18 wherein the mole ratio of halosilane to azide is from 1:1 to 1:1.5.

20. A process according to claim 19 wherein the reaction is carried out in the presence of an organic compound which is liquid at room temperature and in which at least one of the reactants is at least partially soluble.

21. A process according to claim 19 comprising separating the halide salt from the reaction product and then at least partially hydrolyzing the azido containing organosilicon compound.

22. A process according to claim 21 including the step of rectifying the azido containing organosilicon compound after separating the halide salt and prior to hydrolysis.

23. A process according to claim 18 wherein the hydrolysis is only partial.

24. A process according to claim 19 comprising at least partially hydrolysing the halosilane prior to reacting the halosilane with the azide.

25. A process according to claim 24 wherein the hydrolysis is only partial.

26. A process according to claim 19 wherein there is employed a 10% excess of the azide.

27. A process according to claim 20 wherein the reaction is carried out at a temperature between room temperature and the boiling temperature of the reaction mixture.

28. A process according to claim 19 wherein the reaction is carried out at a temperature between about 80° C. and 180° C.

29. A process according to claim 19 where R is a divalent hydrocarbon group having 1 to 8 carbon atoms.

30. A process according to claim 29 where n is zero.

31. A process according to claim 30 where R is an alkylene group of 1 to 4 carbon atoms.

32. A process according to claim 19 where there is employed 0.1 to 12 mole percent of a solid-liquid phase transfer catalyst based on the halosilane.

33. A process according to claim 32 wherein the azide employed is sodium azide.

34. A process according to claim 32 wherein the catalyst is quaternary ammonium salt, a phosphonium salt, or an arsonium salt.

35. A process according to claim 34 wherein the catalyst is a quaternary ammonium salt.

36. A process according to claim 35 where the quaternary ammonium salt is a tetrahydrocarbyl ammonium halide.

37. A process according to claim 32 wherein the catalyst is a crown ether.

* * * * *